United States Patent

[11] 3,613,848

| [72] | Inventor | Donald H. Reiff<br>Cedarburg, Wis. |
|---|---|---|
| [21] | Appl. No. | 857,867 |
| [22] | Filed | Sept. 15, 1969 |
| [45] | Patented | Oct. 19, 1971 |
| [73] | Assignee | Stearns Electric Corporation<br>Milwaukee, Wis. |

[54] FLUID ACTUATED AND LUBRICATED CLUTCH WITH SPLINED RELEASE SPRINGS
6 Claims, 5 Drawing Figs.

| [52] | U.S. Cl. | 192/70.28,<br>192/85 CA, 192/113 B, 267/162 |
|---|---|---|
| [51] | Int. Cl. | F16d 25/00 |
| [50] | Field of Search | 192/85 CA,<br>113 B, 70.28 |

[56] References Cited
UNITED STATES PATENTS

| 2,639,013 | 5/1953 | Meschia | 192/70.28 X |
|---|---|---|---|
| 3,016,119 | 1/1962 | Rosenberger et al. | 192/70.28 X |
| 3,171,522 | 3/1965 | Petrie et al. | 192/70.28 |
| 3,249,189 | 5/1966 | Schjolin et al. | 192/70.28 X |
| 3,429,410 | 2/1969 | Hansen | 192/85 CA |
| 3,412,834 | 11/1968 | Root | 192/85 CA |

*Primary Examiner*—Benjamin W. Wyche
*Attorney*—Wheeler, House & Wheeler

ABSTRACT: A stack of coupling disks for frictionally clutching relatively rotatable shafts has interleaved convoluted springs splined to the shafts for clutch release. The disks are subjected to fluid pressure through a needle bearing from a relatively fixed ram. A separate source of liquid is conducted from a fixed portion of the ram into one of the relatively movable clutch parts and fed to various disks of the stack.

INVENTOR
DONALD H. REIFF
BY Wheeler, Wheeler, House & Clemency
ATTORNEYS

FLUID ACTUATED AND LUBRICATED CLUTCH WITH SPLINED RELEASE SPRINGS

BACKGROUND OF INVENTION

Hydraulically actuated coupling devices are well known but have heretofore presented problems in the lubrication and release of the clutch disks in the stack.

SUMMARY OF INVENTION

A fluid-actuated ram which does not rotate has antifriction bearing means for transmitting thrust to a stack of two interleaved sets of clutch disks constituting the coupling between two shafts. Annular springs of wavy contour are interleaved between the clutch disks of one set to bias the disks apart when clutch-applying fluid pressure is relieved. The springs are interlocked with the shaft and thereby oriented to maintain their wavy contours in registry in axial alignment, it being found that this tends to break capillary attraction of the disks for each other when the clutch is released.

DETAILED DESCRIPTION

Figure 1:
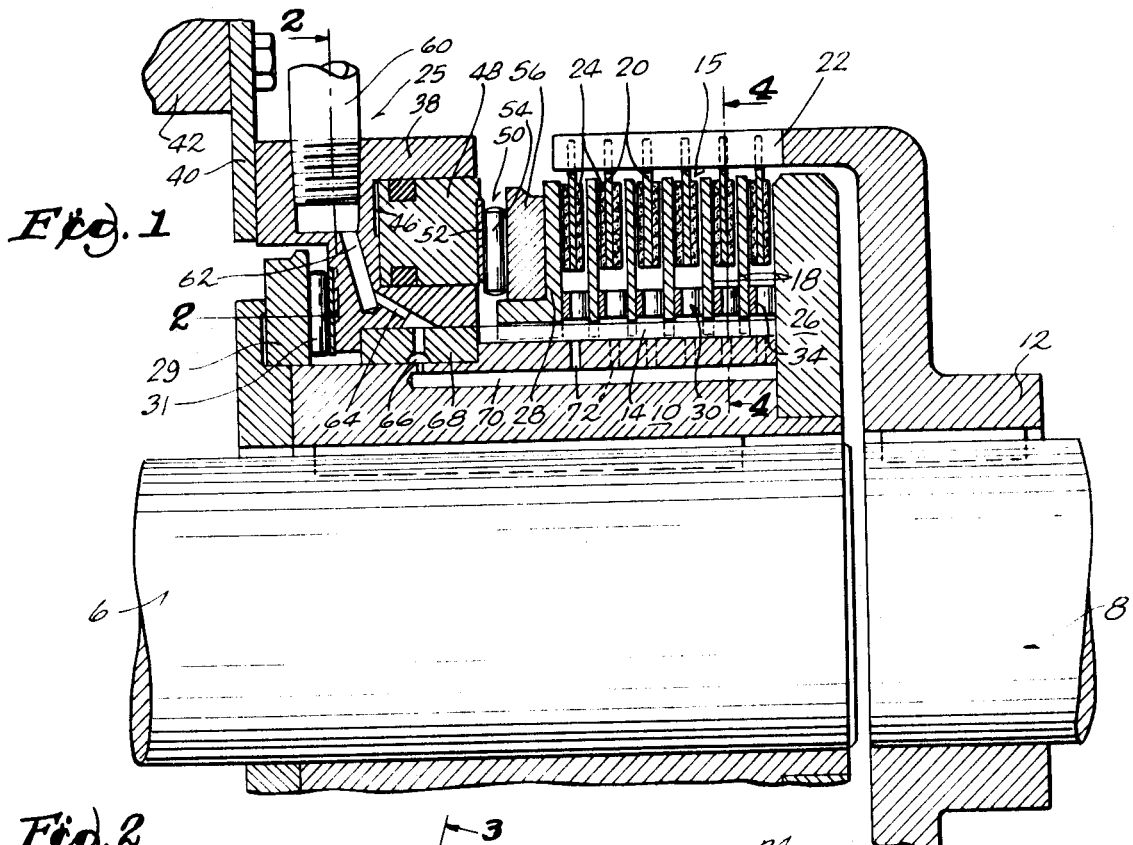
FIG. 1 is a fragmentary view in axial section through a clutch embodying the invention.

The clutch-coupled shafts 6 and 8 are respectively provided with clutch hubs 10 and 12. The hub 10 has a disk carrier comprising peripherally spaced ribs or teeth 14 with intervening channels at 16 extending longitudinally of the hub. In the stack 15 of clutch disks, the disks 18 interlocked with the teeth 14 of hub 10 alternate with disks 20 which are interlocked with the arms 22 which constitute the disk carriers of the hub member 12 on shaft 8. The disks 20 are preferably provided with clutch facings comprising annuli 24 of brake-lining material.

The stack is confined between a fixed annular abutment 26 secured to hub 10, and a pressure plate 28 which, in the instant device, is keyed to the teeth 14 for movement axially of hub 10 to compress the disks of the stack against each other. A ram 25 actuates the pressure plate 28 and is backed by stop ring 29 on hub 10. This ring provides a race or seat for the antifriction needle rollers 31.

Figures 2, 3, 4:
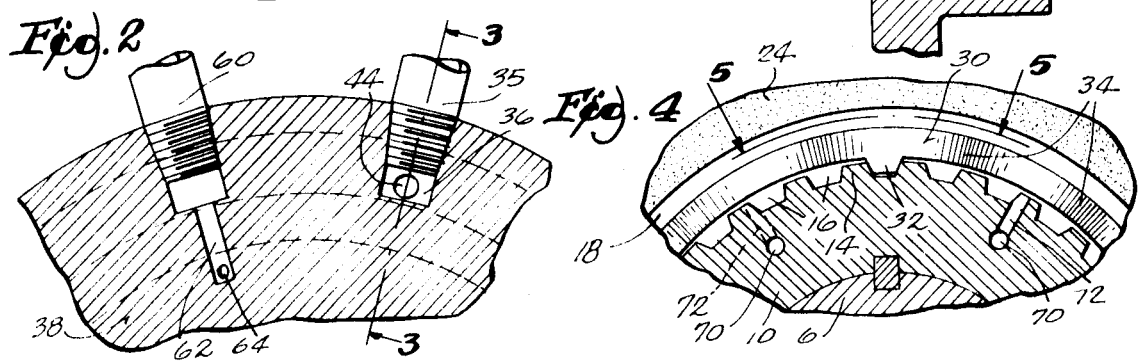
FIG. 2 is a fragmentary detail view taken in section on the line 2—2 of FIG. 1.
FIG. 3 is a fragmentary view in section on the line 3—3 of FIG. 2.
FIG. 4 is a fragmentary detail view taken in section on the line 4—4 of FIG. 1.
Figure 5:
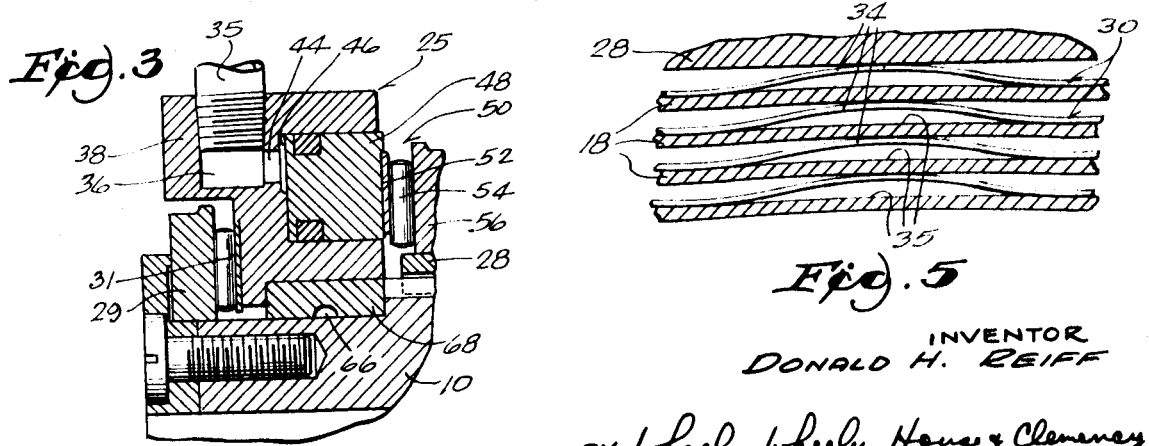
FIG. 5 is a fragmentary detail view taken in section on the line 5—5 of FIG. 4.

It will be observed in FIG. 1 that there is considerable radial clearance between the hub 10 and the annular disks 20 of the stack. In this clearance the convoluted or wavy springs 30 are inserted as shown in FIGS. 1, 4 and 5. Each of the springs has at least one tooth 32 on its inner periphery, such tooth being engaged in one of the channels 16 as shown in FIG. 4, the object being to maintain the spring oriented in a particular position upon the hub 10. Not all of the teeth 32 engage in the same channel 16 but the arrangement is such that the convolutions of the several springs are in registry so that the convex portions 34 are aligned as illustrated in FIG. 5.

It is found that when these convolutions are aligned as shown, they bring about a very slight deformation 35 of the annular disks 18. This deformation extends radially into the stack and facilitates movement of lubricating oil and also minimizes oil adhesion of the disks of the stack to each other. If the disks of the stack were entirely parallel and in full face contact, the oil would create a relatively strong adhesion which would tend to prevent the clutch from releasing promptly upon discontinuance of hydraulic pressure. In practice the deformation is so slight as to be nearly imperceptible. The showing of disk deflection at 35 in FIG. 10 is, therefore, greatly exaggerated.

Hydraulic pressure is applied to a clutch-engaging ram. A fluid pressure line 35 leads to a well 36 in a relatively fixed cylinder block 38 which may be anchored by arm 40 to a stationary member 42 as shown in FIG. 1. From the well 36, a port 44 opens into a ram cylinder 46 in which the ram piston 48 is reciprocable, creating thrust on the bearing 50. The piston 48 has an annular race surface 52 engaged with the needles 54 of the bearing. An opposing race 56 is mounted on the thrust plate 28 of the clutch. Ram pressure is thus exerted through the bearing 50 to engage the clutch. The clutch is released by the relaxation of such pressure through conventional valving not here shown.

The block 38 not only serves as a means of communicating pressure to the ram but also serves as a means of communicating a lubricant from the pipe 60 through bore 62 and duct 64 to an annular groove 66 in a ring 68 which encircles hub 10. The groove 66 maintains continuous communication between the lubricant supply pipe 60 and an axial duct 70 in the hub 10. Branch ducts 72 are axially and circumferentially offset and lead to the different channels 16 between the splines 14 of hub 10. The lubricant supplied to these channels is discharged centrifugally past the convoluted springs 30 to bathe with lubricant the opposing faces of the disks 18 of the stack.

Some of the oil supplied by pipe 60, through bore 62 and duct 64 escapes between bearing 68 and hub 10 and lubricates the bearing 68 and the needle bearings 54 and 31. The amount of oil that flows to the bearings is controlled by the amount of clearance between bearing 68 and hub 10. The amount of oil to the disks is controlled by the size of the metering holes between channel 66 and duct 70.

Normally, the clutch is housed and the small amount of oil used for lubrication is discharged centrifugally and picked up by the housing. However, since the present invention is not concerned with the housing, and a showing would merely confuse the illustration of the invention, no housing is illustrated.

There are many ways in which oil from a single source may be used to perform both functions. For example, pipe 60 may be omitted and duct 62 plugged. A metering duct may then be provided from well 36 to the duct 64, thereby enabling oil delivered through pipe 35 to provide both ram pressure and bearing lubrication.

It will be observed that fluid for both the engagement of the clutch and the lubrication thereof can be supplied through adjacent pipes leading into and through the same fixed ring 38. Yet these fluid connections do not interfere in any manner with each other or with the operation of shafts 6 or 8 or the clutching and declutching thereof.

I claim:

1. In a fluid-operated clutch the combination with aligned clutch hubs and a stack of disks alternately connected respectively with said hubs, of means for applying fluid pressure to engage said disks and including a ram having a cylinder block and piston and bearing means for communicating ram pressure to the disks of said stack, one of said hubs having a duct for lubricating liquid, means for supplying lubricating liquid to said duct, said duct having an opening for discharging said liquid into said stack, annular clutch releasing springs of wavy contour interposed between the disks connected to one of said hubs and concentric with the hubs, the disk connected with the other of said hubs being radially external of said springs, said springs having convolutions with high and low points, the high and low points of adjacent springs being substantially aligned axially of the clutch, and means for maintaining said spring high and low points in circumferential position.

2. A clutch according to claim 1 in which the several springs are annular and encircle one of said hubs which is provided with splined teeth and intervening grooves, several springs having tongue portions engaged in respective grooves as a means of maintaining orientation of the springs.

3. A fluid clutch comprising aligned hubs having inner and outer disk carriers, a stack of disks interleaved with each other and connected alternately with respective carriers, the carriers and disks having interengaged teeth constraining the disks to rotate with respective carriers, annular springs coaxial with said disks and intervening between the disks of one of said carriers and radially spaced from the disks of the other of said carriers, said springs constituting means for biasing toward axial separation the disks engaged thereby and comprising convolutions with high and low points in substantial axial alignment longitudinally of the clutch, means for maintaining said spring high and low points in circumferential position, the engaged disks being very slightly deformed by said convolutions, and means for introducing lubricant into the clutch, movement of the lubricant between the disks of said stack being facilitated by such deformation.

4. A fluid-actuated clutch comprising a first hub and a second hub, a stack of disks, the first hub having means for nonrotatively engaging the inner peripheries of alternate disks and the second hub having means for nonrotatively engaging the outer peripheries of intervening alternate disks, abutment means on the first hub confining said stack of disks, an annular pressure member having means guiding it for movement along the first hub toward said abutment and for subjecting the several disks of the stack to pressure for engagement thereof to effect motion transmission between said hubs, a relatively nonrotatable ram including an annular cylinder and an annular piston encircling the first hub and having a bearing for transmitting ram pressure to the pressure member, ram confining means consisting of a stop ring on the first hub and an antifriction bearing between the stop ring and the ram, means including a pressure supply connection to the ram cylinder for the displacement of the piston to engage the disks of said stack, and a separate means for supplying lubricant, said last means including a duct extending through the ram cylinder and communicating with a longitudinal duct with which said first hub is provided, said first hub further having branch ducts leading from the last ducts and opening into said stack.

5. A clutch according to claim 4 in which alternate disks of said stack have less radial extent than the intervening disks of said stack and convoluted springs are interposed between said alternate disks and radially spaced from said intervening disks, said springs biasing said alternate disks in a direction for the disengagement thereof.

6. A clutch according to claim 5 in which the convoluted springs have their convolutions in substantial alignment axially of the first hub and have means engaging the first hub for orienting said springs to maintain the aforesaid alignment of the convolutions.